Nov. 19, 1968 W. H. SMYERS, JR 3,411,353
FORCE MEASURING APPARATUS
Original Filed Sept. 10, 1964 2 Sheets-Sheet 1
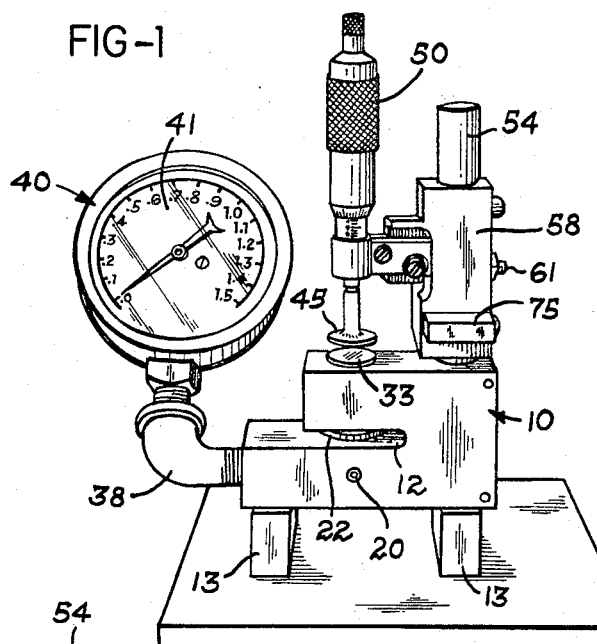
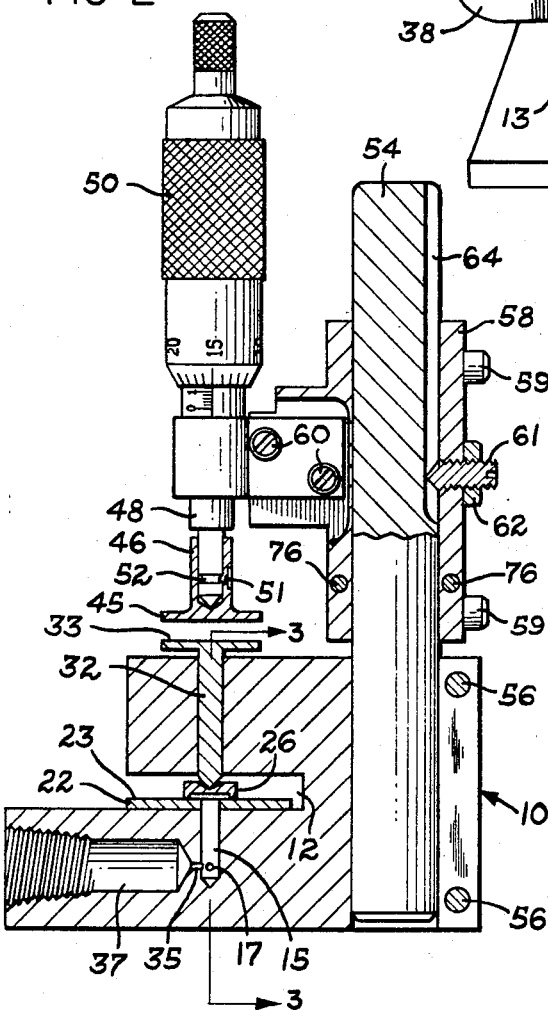
INVENTOR.
WILLIAM H. SMYERS, JR.

Nov. 19, 1968     W. H. SMYERS, JR     3,411,353
FORCE MEASURING APPARATUS
Original Filed Sept. 10, 1964     2 Sheets-Sheet 2
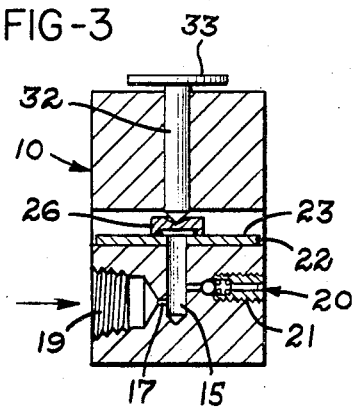
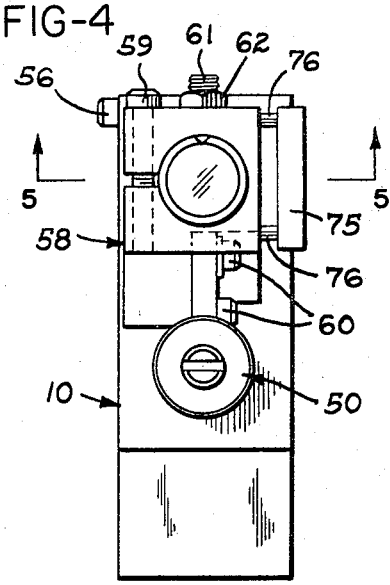
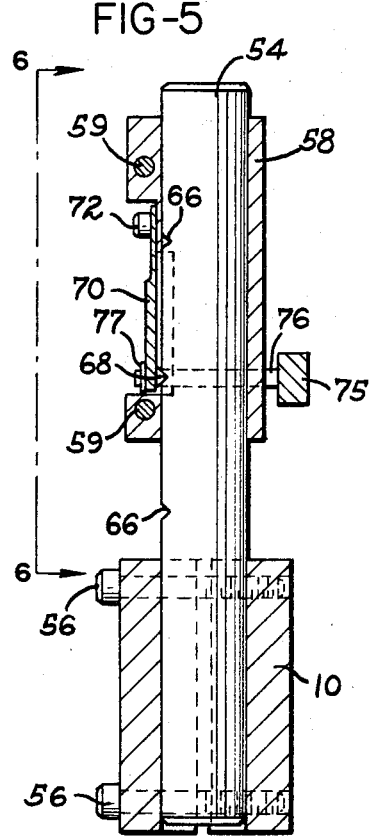
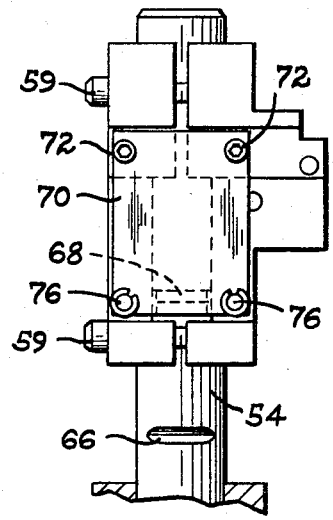
INVENTOR.
WILLIAM H. SMYERS, Jr.
BY
*Marechal, Biebel, French & Bugg*
ATTORNEYS 3,411,353
FORCE MEASURING APPARATUS
William H. Smyers, Jr., Dayton, Ohio, assignor to Koehler-Dayton, Inc., a corporation of Ohio
Continuation of application Ser. No. 395,479, Sept. 10, 1964. This application June 14, 1967, Ser. No. 646,122
6 Claims. (Cl. 73—161)

ABSTRACT OF THE DISCLOSURE

Apparatus including a body defining an air chamber having an outlet surrounded by a smooth surface forming a seat for a force sensing member connected to a movable platform. Air is supplied to the chamber and the flow from said outlet is restricted by the force sensing member, and indicating means registers the changes of air pressure within the chamber in response to minute movement of the sensing member. A micrometer supports a pressure plate above the platform and is quickly released to slide on a supporting post for conveniently inserting and removing articles between the pressure plate and platform.

Related application

This application is a continuation of my copending application Ser. No. 395,479, filed Sept. 10, 1964, now abandoned.

This invention relates to an apparatus for measuring the magnitude of a force, and more particularly, to a fluid operated apparatus which is adapted to sense and measure with preciseness forces ranging from only a fraction of a pound up to forces of substantial magnitude.

In its basic form, the present invention is directed to an apparatus which is adapted to sense a force and transfer the force to a member which restricts the outlet of a chamber in which fluid flows and thereby builds up the fluid pressure in the chamber in a manner directly proportional to the magnitude of the force. While air is preferred as the fluid employed in the apparatus, it is to be understood that other fluids may be used, such as oil or water which may or may not be recirculated. Furthermore, while a preferred form of the apparatus, according to the invention, is shown in the drawings as a form primarily adapted for compression testing of springs and the like, it is to be understood that the invention may have other forms of construction with other applications, as for example, a weighing scale or an apparatus for sensing or measuring minute deflections which result in producing a force.

Many present force-measuring devices such as spring testers, have considerable movement of the force sensing platform and as a result, a distance measuring device such as a machinist's dial indicator must generally be used to measure this movement if the precise deformed length of the spring is to be determined. Such an indicator, however, generally exerts a slight force itself on the platform and thus requires the measuring device to be recalibrated or "zeroed out," especially if the spring force to be measured is of small magnitude. Furthermore, only very expensive dial indicators have sufficient accuracy over a wide range of movement. As such, most dial indicators must be set up depending upon the force exerted by the deformed spring and the resulting position of the platform and must be re-set if a different spring is to be tested or if the same spring is to be tested at a different deformed length. These are some of the problems which are eliminated by the apparatus according to the present invention.

Accordingly, it is one primary object of the present invention to provide a novel fluid operated apparatus which is adaptable for sensing and accurately measuring forces by varying the pressure within a chamber without requiring the use of weights, a sensitive balancing mechanism or accessory distance measuring devices.

Another object of the invention is to provide a novel fluid operated apparatus for accurately measuring forces ranging from a high to a low magnitude by providing the apparatus with a plurality of successive or overlapping force ranges which can be selected merely by interchanging one easily removable part.

Another object of the invention is to provide a novel fluid operated force measuring apparatus which is adapted for rapid testing and inspecting of articles which produce a force when deformed, and which eliminates the necessity of changing the calibration of the apparatus when the deformation imposed upon the articles is altered.

As another object, the present invention provides a novel fluid operated apparatus of the character described which is ideally suited for quickly measuring, with consistent accuracy, spring forces ranging from extremely small magnitudes of a fraction of a pound to substantially larger magnitudes and is adapted for quickly deforming the spring to a predetermined precise distance.

A further object of the invention is to provide a novel fluid operated measuring apparatus which accomplishes the afore-mentioned advantages in addition to being inexpensively constructed and economical to manufacture.

Other objects and advantages of the invention will be apparent from the following description, the accompanying drawings and the appended claims.

In the drawings:

FIG. 1 is a perspective view of a preferred form of the invention, which is adapted for measuring the force produced by a compression spring when the spring is deformed to a predetermined length;

FIG. 2 is an elevational view, partially in section, showing the general construction of the apparatus shown in FIG. 1;

FIG. 3 is a detail sectional view as viewed along the line 3—3 of FIG. 2;

FIG. 4 is a plan view of the apparatus shown in FIG. 1, omitting the pressure gage and base;

FIG. 5 is a detail view, partially in section, of the apparatus, as viewed along the line 5—5 of FIG. 4;

FIG. 6 is a side elevational view taken along the line 6—6 of FIG. 5; and

FIG. 7 is an enlarged sectional view of the load sensing member shown in FIGS. 2 and 3.

Referring to the drawings, which illustrate a preferred embodiment of the invention, the apparatus includes a body 10 having a slot 12 formed therein and being supported by the body member 13. Formed within the body 10 and below the slot 12 is an air chamber 15 (FIGS. 2 and 3) which receives air preferably under a predetermined controlled pressure through a restricted inlet defined by an opening or hole 17 (FIG. 3) leading from an inlet port 19 which is connected to a suitable air pressure supply line (not shown). In order to maintain substantially constant pressure within the inlet port 19 upstream of the restricted inlet opening 17, a suitable air pressure regulator (not shown) is installed in the air supply line and may be set at some level slightly lower than the lowest system supply pressure likely to be encountered. The ball-type relief valve 20 is connected to the chamber 15 to prevent a pressure build-up in the chamber beyond a predetermined value by releasing the air pressure through the hollow set screw 21.

As shown in FIGS. 2 and 3, an annular shaped valve seat 22 is affixed to the body 10 surrounding the top outlet of the chamber 15. Preferably, the valve seat 22 includes a flat, smooth top surface 23 which has a lapped finish or the equivalent. The valve seat 22 is joined to the body 10 by a suitable cement which provides an airtight seal between the valve seat 22 and the body 10.

A force sensing member 26 is positioned within the slot 12 and is adapted to cover the top opening or outlet of the chamber 15 in order to restrict the outflow of air from the chamber 15. While the force sensing member 26 could be formed in any number of configurations, it is preferred that the sensing member have the form of a round or button shape with a bottom which includes a cup-like concaved portion 27 with a narrow annular seating edge 28 so that the restriction to the air flow is defined by a small annular gap 29 (FIG. 7) between the member 26 and the top surface 23 of the valve seat 22.

The top surface of the member 26 has a somewhat conical shape cavity 30 which is adapted to receive the pointed tip 31 of a pin 32 which extends downwardly and is integrally formed from a force platform 33 and which is mounted for smoothly sliding movement within a hole formed in the body 10 above the slot 12 in a position directly overhead of the air chamber 15. When the platform 33 receives a force, the force is transferred directly to the sensing member 26 which restricts the outlet of the chamber 15 by the gap 29. As the flow area from the chamber 15 is restricted, the air pressure within the chamber 15 increases and is reflected through the restricted opening 35, through the port 37 and elbow 38 to a suitable pressure gage 40. The restricted opening 35 is provided to eliminate substantially any pulsations within the gage 40. While a dial-type pressure gage is shown in FIG. 1, it is to be understood that other types of pressure indicating devices may be employed, as for example, a water or mercury monometer, or a recording pressure transducer if a permanent record is desired.

Preferably, the face 41 of the gage 40 is calibrated according to the area covered by the force sensing member 26 on the valve seat 22. For example, if the load sensing member is approximately .357 inch in diameter, the area covered by the sensing member 26 would be 0.1 square inch. Thus, with a .357 inch diameter sensing member, a force of 1.0 pound on the platform 33 would develop a pressure within the chamber 15 of 10 p.s.i., and the pressure gage 40 can be calibrated to read directly 1.0 pounds at 10 p.s.i.

As a further example, if a load sensing member 26 of approximately .114 inch in diameter was interchanged for the .357 inch diameter sensing member, the area covered by the sensing member would be .01 square inch and thus the force range is decreased by 10, so that a 0.1 pound force on the platform will yield 10 p.s.i. pressure and will indicate the same 1.0 pound on the dial gage and it is only necessary to divide the reading by 10 to arrive at the correct magnitude of the force. Similarly, if a force sensing member of approximately 1.135 inch in diameter is used, the area covered by the sensing member would be one square inch and the reading obtained from the face of the dial gage would be multiplied by a factor of 10 in order to obtain the true force on the platform 33.

It becomes apparent that when measuring light forces, the total weight of the platform 33, pin 32 and member 26 becomes significant and accordingly, a suitable calibration curve may be employed or a second pointer may be used on the gage to indicate precisely the magnitude of the force. The original calibration, however, may be accomplished by setting standard weights on the platform 33 and making appropriate adjustments in the pressure gage 40. As mentioned above, the relief valve 20 is provided to prevent the pressure within the chamber 15 from exceeding a predetermined level corresponding to the maximum safe pressure that can be received by the gage 40. For example, when a very small load sensing member is used, an inadvertantly applied force could be sufficient to close completely the outlet and thereby transfer line pressure to the gage which could possibly damage the gage depending upon the setting of the line pressure. Thus, if the useful scale range was up to 10 p.s.i.g. the relief valve may be set at 13 p.s.i.g.

It can be seen from FIG. 2, that the sensing member 26 may be interchanged simply by raising the platform 33 and integral pin 32 so that one sensing member 26 may be moved out of the slot 12 and another one inserted. The point contact between the pointed tip 31 of the pin 32 and the sensing member 26 enables the sensing member to pivot slightly about the end of the pin 32. This permits uniform flow of air around the periphery of the sensing member 26, and in addition, maintains the sensing member 26 concentric with the air chamber 15.

In order to employ the apparatus as a compression tester, which is adapted, for example, for high speed inspection of compression springs which must be deformed to a predetermined length, an adjustable mounted pressure plate 45 is suspended directly overhead of the load platform 33. Integrally connected to the pressure plate 45 is a tubular sleeve 46 which is connected loosely for free turning to the end of a spindle 48 of a micrometer 50. To retain the tubular sleeve 46 on the end of the spindle 48 a thin wall portion 51 of the tubular sleeve 46 is staked into an annular groove 52 formed within the end of the spindle 48.

A guide post 54 is provided to support the micrometer 50 and is mounted vertically within a hole in the body 10 and is clamped therein by the screws 56. Connecting the micrometer 50 to the post 54 is a sleeve 58 which is adapted to slide vertically on the post 54, with any play removed by the proper tightening of the screws 59. The screws 60 serve to retain the micrometer 50 to the sleeve 58, and the set screw 61, having a lock nut 62, cooperates with the V-shape groove 64 in the post 54 to prevent the sleeve 58 from rotating about the post 54 and to maintain the plate 45 directly above the platform 33.

On the rear side of the post 54 are a series of vertically spaced V-shaped notches or identations 66 (FIG. 5) adapted to receive a wedge-shaped member 68 which serves as a detent. This member is normally urged into engagement with a notch 66 by being integrally formed from a flat leaf-type spring member 70 which is fastened in a downwardly extending cantilever manner to the sleeve 58 by the screws 72.

Referring to FIGS. 4, 5 and 6, the spring member 70 and included wedge-shaped member 68 is adapted to be moved out of engagement with a notch 66 by pressing inwardly a bar 75. This is accomplished by the pins 76 which are fastened to the bar 75 and extend through the sleeve 58 for connection to the spring member 70 on opposite sides of the wedge-shaped member 68 by the retaining rings 77. Preferably, the V-shaped notches 66 are spaced one inch apart so that a micrometer 50 having a scale reading of zero to 1.000 inch may be employed for spaces between the load platform 33 and the pressure plate 45 ranging from zero to several inches.

Once the micrometer 50 is set for the precise compression distance desired, the micrometer spindle 48 may be locked at the desired setting and the micrometer may be raised and lowered simply by depressing the bar 75 and moving the sleeve 58 vertically along the post 54. Thus, the pressure plate 45 may be raised for inserting another article, such as a compression spring to be tested, and then be returned to precisely the same setting when the wedge 68 snaps back into a notch 66 without making any adjustments in the micrometer 50. This feature is desirable, for example, to check the forces exerted by many similar compression springs when each is deformed to the same predetermined distance.

Another important feature of the apparatus is that when the apparatus is employed for testing springs of different types, it is not necessary to precalibrate the apparatus before each type, due to the fact that the minute movement of the force sensing member 26 has no significant effect on the distance between the platform 33 and plate 45 when springs producing different forces or load values are inserted for testing. In fact, a movement of approximately .002 inch of the load sensing member 26 is effective to cause the dial indicator of the pressure gage to sweep over approximately the full range of the gage. Furthermore, this movement may be further reduced simply by reducing the size of the restricted inlet openings 17 since a decrease in the flow increases the sensitivity of the system.

It is this minute movement feature which makes the apparatus adaptable for measuring forces resulting from slight movements. For example, the pressure gage may be calibrated to read from zero to .002 inch on the dial instead of zero to 1.5 lbs. whereby the apparatus could then be employed, in effect, as a dial indicator. In a similar manner, the apparatus can be used as a weighing device and is especially useful where large movements of the object being weighed cannot be tolerated. For example, the downward forces exerted by a conveyor belt transporting material could be sensed without the belt deviating from its path.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for quickly measuring a force produced by deforming an article such as a compression spring, comprising a body defining a chamber having a restricted inlet and an outlet and adapted to receive a flow of fluid through said inlet, said body including a smooth surface surrounding said outlet, a force sensing member covering said outlet and adapted to restrict the flow from said outlet so that minute movement of said sensing member is effective to produce substantial change in fluid pressure within said chamber, a platform adapted to support the article and connected to control said minute movement of said sensing member, indicator means connected to said chamber for indicating the pressure within said chamber when said outlet of said chamber is restricted by said sensing member, a pressure plate, a micrometer having an adjustable spindle supporting said pressure plate, guide means rigidly connected to said body, means slidably mounted on said guide means and supporting said micrometer for movement relative to said body, means forming a positive spring biased detent connection between said guide means and said supporting means and locating said micrometer at a precise predetermined position spaced from said body, and means for quickly releasing said detent connection to provide for quickly moving said micrometer relative to said platform and then back to said predetermined position for quickly checking the forces produced by a large number of articles all deformed to the same length without having to read said micrometer for each article.

2. Apparatus as defined in claim 1 wherein said guide means comprises a post rigidly connected to said body, said supporting means for said micrometer include a sleeve slidably mounted on said post, and said detent connection include a wedge and notch connection between said sleeve and said post.

3. Apparatus as defined in claim 2 wherein said connection comprises at least one V-shaped notch within said post, a generally flat leaf spring mounted on said sleeve and extending generally parallel to said post, a wedge member rigidly connected to said spring, and means for manually bending said leaf spring to release said wedge member from said notch.

4. Apparatus for quickly measuring a force produced by deforming an article such as a compression spring, comprising force sensing means including a platform adapted to support the article, means responsive to minute movement of said platform for indicating the magnitude of a force exerted on said platform, a pressure plate, a micrometer having an adjustable spindle supporting said pressure plate, guide means connected to said body, means slidably mounted on said guide means and supporting said micrometer for movement relative to said body, means forming a positive spring biased detent connection between said guide means and said supporting means and locating said micrometer at a precise predetermined position spaced from said body, and means for quickly releasing said detent connection to provide for quickly moving said micrometer relative to said platform and then back to said predetermined position for quickly checking the forces produced by a large number of articles all deformed to the same length without having to read said micrometer for each article.

5. Apparatus as defined in claim 4 wherein said guide means comprises a post rigidly connected to said force sensing means, said supporting means for said micrometer include a sleeve slidably mounted on said post, and said detent connection comprises a wedge and notch connection between said sleeve and said post.

6. Apparatus as defined in claim 5 wherein said connection comprises at least one V-shaped notch within said post, a generally flat leaf spring mounted on said sleeve and extending generally parallel to said post, a wedge member rigidly connected to said spring, and means for manually bending said leaf spring to release said wedge member from said notch.

References Cited

UNITED STATES PATENTS

| | | | |
|---|---|---|---|
| 2,455,285 | 11/1948 | Versaw | 73—88 |
| 2,729,968 | 1/1956 | Segerstad et al. | 73—392 |
| 2,746,288 | 5/1956 | Scott | 73—141 |
| 3,108,649 | 10/1963 | Hamilton | 73—141 |
| 2,706,404 | 4/1955 | Schiesel | 73—161 X |
| 3,108,649 | 10/1963 | Hamilton | 73—141 X |

FOREIGN PATENTS

| | | |
|---|---|---|
| 938,171 | 10/1963 | Great Britain. |
| 873,880 | 7/1942 | France. |
| 938,171 | 10/1963 | Great Britain. |

RICHARD C. QUEISSER, *Primary Examiner.*

J. H. WILLIAMSON, *Assistant Examiner.*

UNITED STATES PATENT OFFICE
CERTIFICATE OF CORRECTION

Patent No. 3,411,353          Dated    Nov. 19, 1968

Inventor(s)   William H. Smyers, Jr.

It is certified that error appears in the above-identified patent and that said Letters Patent are hereby corrected as shown below:

In the heading to the printed specification, line 7, "6 Claims." should read -- 7 Claims. --.

Column 2, line 52, "body member 13" should read -- leg members 13 --.

Column 3, line 50, "platform" shoud read -- platform 33 --.

Column 6, after line 43 insert:

7. An apparatus for accurately measuring a force produced by a deformed article, comprising a body defining a chamber having a restricted inlet and an outlet and adapted to receive a flow of fluid through said inlet, said body including a smooth flat surface surrounding said outlet, a relief valve connected to said chamber and adapted to release the fluid when the pressure exceeds a predetermined value, a force sensing member having an inverted cup-like configuration with a narrow seating edge resting on said surface covering said outlet and adapted to be moved away from said surface to vary the pressure in said chamber in proportion to the magnitude of the load, a platform adapted to support the article and to move said sensing member, indicator means connected to said chamber for indicating the pressure within said chamber when the outlet of said chamber is restricted by said sensing member, a post extending vertically from said body, a sleeve slidably mounted on said post, detent means including a leaf type spring mounted on said sleeve and adapted to engage indentations in said post for spacing said sleeve on said post, a micrometer connected rigidly to said sleeve and adapted to move vertically with said sleeve, and a pressure plate connected to said micrometer and adapted to cooperate with said platform for deforming the article to produce a force.

Signed and sealed this 11th day of April 1972.

(SEAL)
Attest:

EDWARD M. FLETCHER, JR.                ROBERT GOTTSCHALK
Attesting Officer                      Commissioner of Patents